(12) United States Patent
Kiwata

(10) Patent No.: US 12,264,053 B2
(45) Date of Patent: Apr. 1, 2025

(54) REMOTE OPERATION SYSTEM OF FORKLIFT

(71) Applicant: Mitsubishi Logisnext Co., Ltd., Kyoto (JP)

(72) Inventor: Keisuke Kiwata, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 206 days.

(21) Appl. No.: 17/878,918

(22) Filed: Aug. 2, 2022

(65) Prior Publication Data
US 2023/0391594 A1 Dec. 7, 2023

(30) Foreign Application Priority Data
Jun. 3, 2022 (JP) ................................. 2022-091034

(51) Int. Cl.
*B66F 9/075* (2006.01)
(52) U.S. Cl.
CPC ................................ *B66F 9/07581* (2013.01)
(58) Field of Classification Search
None
See application file for complete search history.

(56) References Cited

U.S. PATENT DOCUMENTS

| | | | | |
|---|---|---|---|---|
| 2004/0130464 A1* | 7/2004 | Schindler | .................. | B60R 1/26 348/148 |
| 2009/0198414 A1* | 8/2009 | Mohning | .................. | B62D 1/12 280/93.5 |
| 2016/0335981 A1* | 11/2016 | Koo | ........................ | G09G 5/003 |
| 2019/0135598 A1 | 5/2019 | Agarwal et al. | | |
| 2019/0387203 A1* | 12/2019 | Sue | ........................ | G05D 1/0088 |
| 2021/0079627 A1* | 3/2021 | Subramanian | ...... | G06F 16/2322 |

FOREIGN PATENT DOCUMENTS

| | | |
|---|---|---|
| CN | 111977568 | 11/2020 |
| EP | 3556713 | 10/2019 |
| JP | 2015226094 | 12/2015 |
| JP | 2018121195 | 8/2018 |
| JP | 6973225 | * 10/2019 |
| WO | 2019181664 | 9/2019 |

OTHER PUBLICATIONS

"Search Report of Europe Counterpart Application", issued on Jun. 2, 2023, pp. 1-11.

* cited by examiner

*Primary Examiner* — Hongye Liang
(74) *Attorney, Agent, or Firm* — JCIPRNET

(57) ABSTRACT

A remote operation system 1 includes: an image capturing device 20, provided at a forklift F; a head-mounted type image display device 10, mounted to a head of an operator O; a command reception device 11, receiving a remote operation command by the operator O; and a synthesized remote image generation device 12A, obtaining a content of the remote operation command received by the command reception device 11, an action state of the forklift F acting according to the remote operation command, and a remote image captured by the image capturing device 20, and generating a synthesized remote image by synthesizing a command display image indicating the content of the remote operation command and an action display image indicating the action state of the forklift F into the remote image. The head-mounted type image display device 10 displays the generated synthesized remote image before eyes of the operator O.

6 Claims, 5 Drawing Sheets

REMOTE OPERATION SYSTEM OF FORKLIFT

CROSS-REFERENCE TO RELATED APPLICATION

This application claims the priority benefit of Japan application serial no. 2022-091034, filed on Jun. 3, 2022. The entirety of the above-mentioned patent application is hereby incorporated by reference herein and made a part of this specification.

BACKGROUND

Technical Field

The invention relates to a remote operation system allowing to remotely operate a forklift at a separate place while viewing a remote image displayed on a head-mounted type image display device.

Description of Related Art

Conventionally, a remote operation system allowing to remotely operate a work machine at a separate place while viewing a remote image displayed on a head-mounted type image display device is known. For example, Patent Document 1 discloses a remote operation system for remotely operating an excavator as the work machine.

The system disclosed in Patent Document 1 is configured to switch the contents of an image displayed on a head-mounted type image display device in accordance with a movement of the head of the operator detected by a wearable sensor. Specifically, in the system, when the head of the operator pitches down, the displayed image is switched from a front image (remote image) captured by an image capturing device installed to the excavator to an instrument screen image, and when the head of the operator pitches up from this state, the displayed image is switched back to the remote image.

PRIOR ART DOCUMENT

Patent Document

[Patent Document 1] Japanese Laid-open No. 2015-226094

In the system disclosed in Patent Document 1, the remote image or the instrument screen image is selectively displayed on the head-mounted type image display device. That is, in the system, no instrument information of the excavator is provided to the operator confirming the movement of an arm by using the remote image. Therefore, the operator needs to operate a remote operation with information less than the information obtained when performing a boarding operation.

SUMMARY

In order to solve the above issue, a remote operation system according to the invention includes: an image capturing device, provided at a forklift at a place separate from an operator; a head-mounted type image display device, mounted to a head of the operator; a command reception device, within reach of a hand of the operator and receiving a remote operation command by the operator; and a synthesized remote image generation device, obtaining a content of the remote operation command received by the command reception device, an action state of the forklift acting in accordance with the remote operation command, and a remote image captured by the image capturing device, and generating a synthesized remote image by synthesizing a command display image indicating the content of the remote operation command and an action display image indicating the action state of the forklift into the remote image. The head-mounted type image display device displays the synthesized remote image that is generated by the synthesized remote image generation device before eyes of the operator.

The head-mounted type image display device of the remote operation system may also include a posture detection part detecting a posture of a head of the operator. In such case, the synthesized remote image generation device of the remote operation system obtains the posture detected by the posture detection part, and generates the synthesized remote image by synthesizing the command display image and the action display image into a portion of the remote image that is cut out in accordance with the posture.

The synthesized remote image generation device of the remote operation system: (1) may be disposed on a side of the operator, and obtain the action state of the forklift and the remote image from the forklift via an Internet line; (2) may be disposed at the forklift, and obtain the content of the remote operation command from the command reception device via an Internet line; and (3) may be disposed at a place separate from the operator and the forklift, obtains the action state of the forklift and the remote image from the forklift via an Internet line, and obtain the content of the remote operation command from the command reception device via the Internet line.

The command reception device of the remote operation system may include four buttons arranged in a cross shape and corresponding to lifting and lowering of a fork provided at the forklift and forward and backward leaning of a mast provided at the forklift. In such case, the command display image may include four cargo symbols arranged in a cross shape and corresponding to the four buttons, and when any one of the four buttons is operated, an appearance of the cargo symbol corresponding to the button may change.

The command reception device of the remote operation system may include an analog stick for providing a command on a traveling direction and a traveling speed of the forklift. The command display image may include a vehicle symbol with the forklift set as a motif and a traveling symbol whose relative position from the vehicle symbol changes in response to a tilting direction and a tilting amount of the analog stick.

DESCRIPTION OF THE EMBODIMENTS

The invention provides a remote operation system capable of providing beneficial and abundant information to an operator performing a remote operation while viewing a remote image.

In the following, the embodiments of the remote operation system according to the invention will be described with reference to the drawings.

Figure 1:
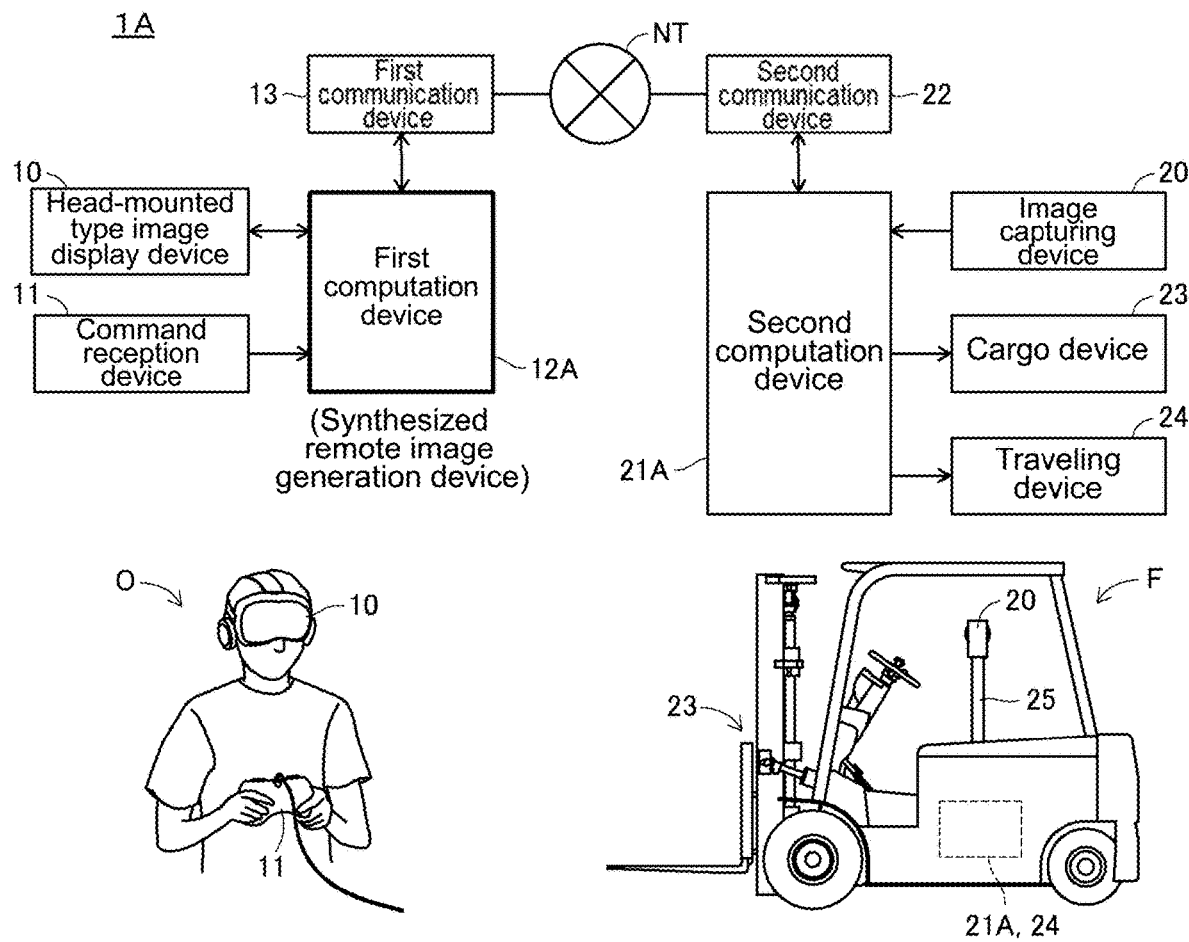
FIG. 1 is a view illustrating a configuration of a remote operation system according to a first embodiment of the invention.

FIG. 1 is a view illustrating a remote operation system 1A according to a first embodiment of the invention. The remote operation system 1A is a system for an operator O to remotely operate a forklift F at a separate place. As shown in FIG. 1, the remote operation system 1A includes a head-mounted type image display device 10, a command reception device 11, a first computation device 12A, and a first communication device 13 on the side of the operator O, as well as an image capturing device 20, a second computation device 21A, and a second communication device 22 on the side of the forklift F.

The head-mounted type image display device 10 is known as a head-mounted display (HMD). The head-mounted type image display device 10 is mounted to the head of the operator O, and displays a synthetic remote image, which will be described afterwards, before the eyes of the operator O.

The head-mounted type image display device 10 has a posture detection part not shown herein. The posture detection part detects a posture of the head of the operator O, and outputs a signal (referred to as "posture signal" in the following) corresponding to the posture. The posture signal includes a signal indicating to which extent the head of the operator O tilts in the left-right direction and a signal indicating to which extent the head of the operator O tilts in the upper-lower direction.

Figure 2:
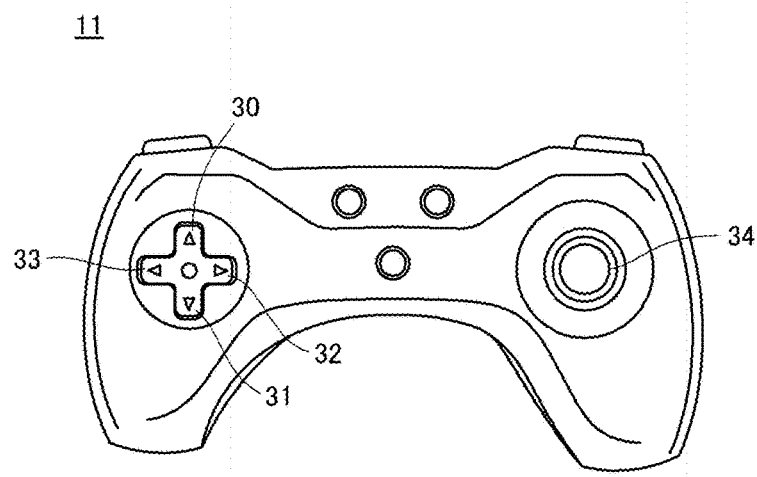
FIG. 2 is a view illustrating a command reception device of the remote operation system according to the first embodiment.

The command reception device 11 is similar to a controller of a game console, and, as shown in FIG. 2, includes four buttons 30, 31, 32, and 33 arranged in a cross shape and an analog stick 34. The command reception device 11 outputs a signal indicating whether each of the buttons 30, 31, 32, and 33 is pressed (referred to as "button operation signal" in the following) and a signal indicating a tilting direction and a tilting amount of the analog stick 34 (referred to as "stick operation signal" in the following). The buttons 30, 31, 32, and 33 are operated by using the left thumb of the operator O. Also, the analog stick 34 is operated by using the right thumb of the operator O.

The first computation device 12A is similar to a personal computer, and is wiredly connected to the head-mounted type image display device 10 and the command reception device 11 via an interface for external machine connection, such as USB. In the embodiment, the first computation device 12A is equivalent to a "synthesized remote image generation device".

The first communication device 13 is similar to a router, and is wiredly connected to the first computation device 12A via a communication interface such as LAN. The first communication device 13 is also connected to an Internet line NT.

The image capturing device 20 is a 360° camera installed to the forklift F. In stead of a seat for an operator to be seated, the forklift F includes a pole 25 having a length less than 1 m, and the image capturing device 20 is installed to an upper end of the pole 25. That is, the image capturing device 20 is installed to a position where the head of the operator is located in the case where the operator is seated at the seat. The image capturing device 20 captures a 360° remote image and outputs a signal (referred to as "remote image signal" in the following) related to the remote image.

The second computation device 21A is a vehicle control unit ECU capable of controlling a cargo device 23 (which includes a mast, a fork, and a hydraulic system driving the mast and the fork) and a traveling device 24 (which includes a steering device that changes the direction of a steering wheel and a motor that drives a driving wheel). The second computation device 21A is also provided with a function of grasping the state of each part of the forklift F and a function of determining whether an abnormality occurs in each part of the forklift F. The second computation device 21A generates a signal (referred to as "action state signal") relating the state of each part of the forklift F that is grasped and whether an abnormality occurs.

In the embodiment, the second computation device 21A is capable of constantly grasping at least the weight of the load on the fork, a tilt angle of the mast, a lift height of the fork, the rotation number of the motor (the traveling speed of the forklift F) and the residual amount of the battery.

The second communication device 22 is similar to a router disposed in the facility in which the forklift F works, and is wirelessly connected to the second computation device 21A via a communication interface. The second communication device 22 is also connected to the Internet line NT.

When the operator O presses one of the buttons 30, 31, 32, and 33 of the command reception device 11, the button operation signal corresponding to the button (e.g., the first button 30) is transmitted to the second computation device 21A via a path as follows: "command reception device 11→first computation device 12A→first communication device 13→Internet line NT→second communication device 22→second computation device 21A". The button operation signal may be converted into an appropriate form on the path.

The second computation device 21A operates the cargo device 23 in accordance with the button operation signal transmitted from the command reception device 11. Specifically, the second computation device 21A lifts the fork in accordance with the button operation signal corresponding to the first button 30, lowers the fork in accordance with the button operation signal corresponding to the second button 31, makes the mast lean rearward in accordance with the button operation signal corresponding to the third button 32, and makes the mast lean forward in accordance with the button operation signal corresponding to the fourth button 33.

When the operator O tilts the analog stick 34 of the command reception device 11 to any direction, the stick operation signal corresponding to the tilting direction and the tilting amount of the analog stick 34 is transmitted to the second computation device 21A via the same path as the path of the button operation signal, that is "command reception device 11→first computation device 12A→first communication device 13→Internet line NT→second communication device 22→second computation device 21A". The stick operation signal may be converted into an appropriate form on the path.

The second computation device 21A operates the traveling device 24 in accordance with the stick operation signal transmitted from the command reception device 11. Specifically, the second computation device 21A operates the steering device, so that the traveling direction of the forklilft F is consistent with the direction corresponding to the tilting direction indicated in the stick operation signal, and operates the motor so that the traveling speed of the forklift F is consistent with the speed corresponding to the tilting amount indicated by the stick operation signal.

The remote image signal relating to the 360° remote image output by the image capturing device 20 is transmitted to the first computation device 12A via a path as follows "image capturing device 20→second computation device 21A→second communication device 22→Internet line NT→first communication device 13→first computation device 12A". The remote image signal may be converted into an appropriate form on the path.

The action state signal relating to the state of each part of the forklift F and whether an abnormality occurs as grasped by the second computation device 21A is transmitted to the first computation device 12A via a path as follows: "second computation device 21A→second communication device 22→Internet line NT→first communication device 13→first computation device 12A".

The posture signal output by the head-mounted type image display device 10 is transmitted to the first computation device 12A via a path as follows "head-mounted type image display device 10→first computation device 12A".

Accordingly, the first computation device 12A, as the synthesized remote image generation device, obtains the button operation signal and the stick operation signal output by the command reception device 11, the posture signal output by the head-mounted type image display device 10, the remote image signal output by the image capturing device 20, and the action state signal output by the second computation device 21A.

Figure 3:
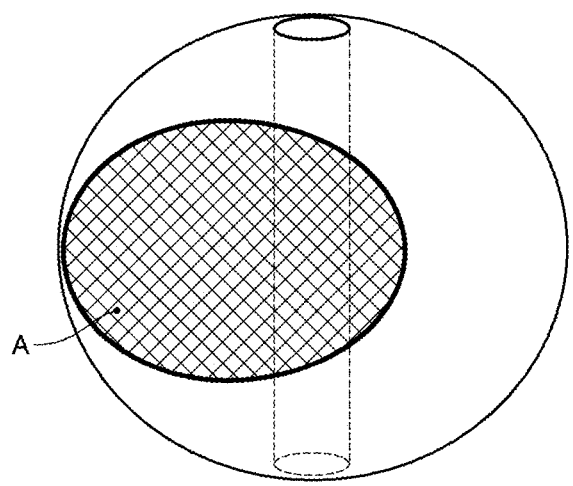
FIG. 3 is a view explaining cutting out an image by using a first computation device of the remote operation system according to the first embodiment.

The first computation device 12A extracts a portion of the remote image based on the obtained posture signal. In other words, the first computation device 12A, as shown in FIG. 3, cuts out an image A in a size equivalent to the field of view of the operator O from the 360° remote image in accordance with the posture of the operator O. If the posture of the head of the operator O changes, the position of the image A that is cut out also changes. Meanwhile, even if the posture of the head of the operator O changes, the size of the image A that is cut out does not change.

The first computation device 12A generates a command display image based on the button operation signal and the stick operation signal that are obtained.

Figure 4:
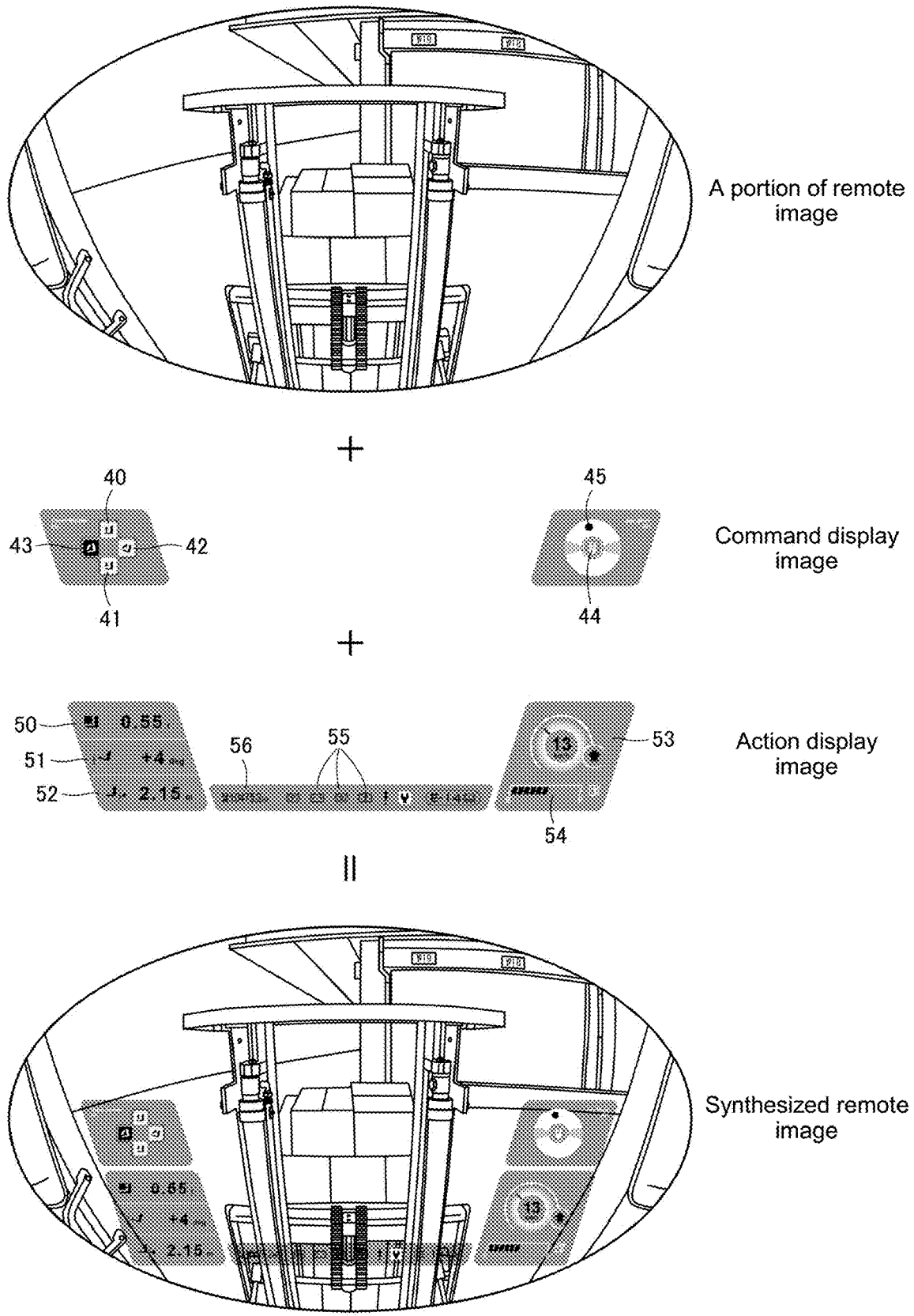
FIG. 4 is a view explaining synthesizing an image by using the first computation device of the remote operation system according to the first embodiment.

As shown in FIG. 4, the command display image includes four cargo symbols 40, 41, 42, and 43 disposed in a cross shape and corresponding to the buttons 30, 31, 32, and 33 of the command reception device 11. The first cargo symbol 40 corresponds to the first button 30 for lifting the fork, and the appearance (e.g., colors, the same applies to the following) changes depending on whether the first button 30 is pressed. The second cargo symbol 41 corresponds to the second button 31 for lowering the fork, and the appearance changes depending on whether the second button 31 is pressed. The third cargo symbol 42 corresponds to the third button 32 for tilting the mast rearward, and the appearance changes depending on whether the third button 32 is pressed. The fourth cargo symbol 43 corresponds to the fourth button 33 for leaning the mast forward, and the appearance changes depending on whether the fourth button 33 is pressed.

As shown in FIG. 4, the command display image further includes a vehicle symbol 44 setting the forklift F as a motif and a traveling symbol 45 located in the vicinity of the vehicle symbol 44. The relative position of the traveling symbol 45 with reference to the vehicle symbol 44 changes in accordance with the tilting direction and the tilting amount of the analog stick 34.

The arrangement of the cargo symbols 40, 41, 42, 43, the vehicle symbol 44, and the traveling symbol 45 in the command display image substantially correspond to the arrangement of the buttons 30, 31, 32, and 33 and the analog stick 34 in the command reception device 11. That is, the symbols 40, 41, 42, and 43 corresponding to the buttons 30, 31, 32, and 33 operated by the left thumb are arranged on the left side of the command display image, and the symbols 44 and 45 corresponding to the analog stick 34 operated by the right thumb are disposed on the right side of the command display image.

The command display image is an image indicating the content of a remote operation command received by the command reception device 11, that is, an image indicating the content of a remote operation command input by the operator O.

The first computation device 12A generates an action display image based on the action state signal that is obtained.

As shown in FIG. 4, the action display image includes a load meter 50 indicating the weight of the load on the fork, a tilt meter 51 indicating the tilt angle of the mast, a lift meter 52 indicating the lift height of the fork, a speed meter 53 indicating the traveling speed of the forklift F, and a battery meter 54 indicating the residual power amount in the battery, and an hour meter 56 indicating the current time or the accumulated operation time. Further to the above, the action display image may also include multiple warning symbols 55 whose appearance changes, such as being lit up, when an abnormality occurs.

As shown in FIG. 4, the first computation device 12A generates a synthesized remote image by synthesizing the command display image and the action display image into the portion (the image A) of the remote image. Then, the first computation device 12A transmits a signal (referred to as "synthesized remote image signal" in the following) related to the synthesized remote image to the head-mounted type image display device 10.

The head-mounted type image display device 10 displays the synthesized remote image before the eyes of the operator O based on the synthesized remote image signal that is transmitted.

In this way, in the remote operation system 1A according to the first embodiment, the command display image and the action display image are presented to the operator O performing the remote operation while viewing the remote image. Therefore, the operator O can confirm that the operation command is correctly received by using the command display image and grasp the state of the forklift F that cannot be grasped from the remote image by using the action display image without interrupting the remote operation.

Second Embodiment

Figure 5:
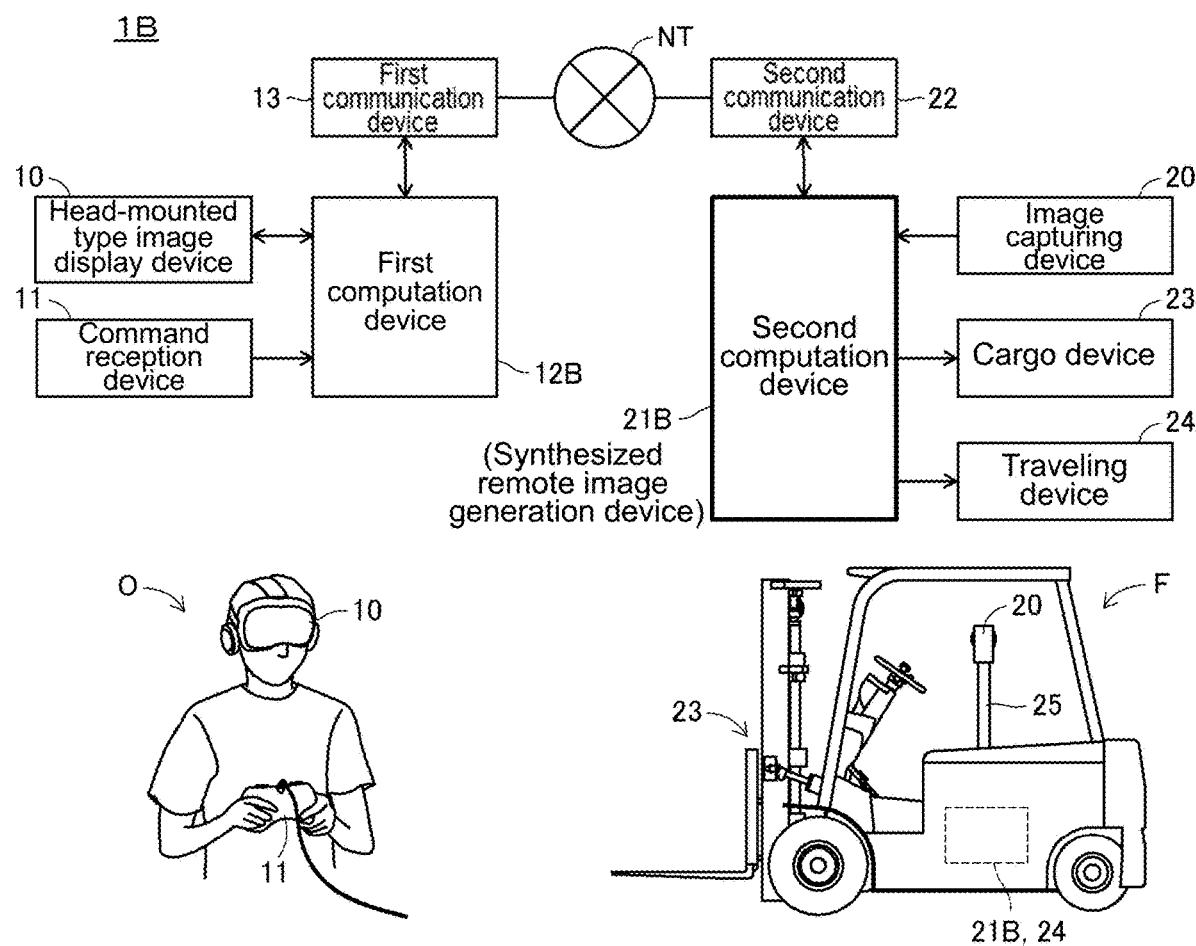
FIG. 5 is a view illustrating a configuration of a remote operation system according to a second embodiment of the invention.

FIG. 5 is a view illustrating a remote operation system 1B according to a second embodiment of the invention. The remote operation system 1B includes the head-mounted type image display device 10, the command reception device 11, a first computation device 12B, and the first communication device 13 on the side of the operator O, as well as the image capturing device 20, a second computation device 21B, and the second communication device 22 on the side of the forklift F. The remote operation system 1B differs from the remote operation system 1A in the point that the remote operation system 1B includes the first computation device 12B instead of the first computation device 12A and includes the second computation device 21B instead of the second computation device 21A, and the rest of the remote operation system 1B is common to the remote operation system 1A.

The first computation device 12B, like the first computation device 12A, is wiredly connected to the head-mounted type image display device 10 and the command reception device 11 via an interface for external machine connection, such as USB.

The second computation device 21B, like the second computation device 21A, is a vehicle control unit ECU capable of controlling the cargo device 23 and the traveling device 24, and is provided with the function of grasping the state of each part of the forklift F and the function of determining whether an abnormality occurs in each part of the forklift F. In addition, like the second computation device 21A, the second computation device 21B generates the action state signal relating to the state of each part of the forklift that is grasped and whether an abnormality occurs. In the embodiment, the second computation device 21B is equivalent to a "synthesized remote image generation device".

When the operator O presses one of the buttons 30, 31, 32, and 33 of the command reception device 11, the button operation signal corresponding to the button (e.g., the first button is transmitted to the second computation device 21B via a path as follows: "command reception device 11→first computation device 12B→first communication device 13→Internet line NT→second communication device 22→second computation device 21B". The button operation signal may be converted into an appropriate form on the path.

The second computation device 21B, like the second computation device 21A, operates the cargo device 23 in accordance with the button operation signal transmitted from the command reception device 11.

When the operator O tilts the analog stick 34 of the command reception device 11 to any direction, the stick operation signal corresponding to the tilting direction and the tilting amount of the analog stick 34 is transmitted to the second computation device 21B via the same path as the path of the button operation signal, that is "command reception device 11→first computation device 12B→first communication device 13→Internet line NT→second communication device 22→second computation device 21B". The stick operation signal may be converted into an appropriate form on the path.

The second computation device 21B, like the second computation device 21A, operates the traveling device 24 in accordance with the stick operation signal transmitted from the command reception device 11.

The remote image signal relating to the 360° remote image output by the image capturing device 20 is transmitted to the second computation device 21B via a path as follows "image capturing device 20→second computation device 21B".

The posture signal output by the head-mounted type image display device 10 is transmitted to the second computation device 21B via a path as follows "head-mounted type image display device 10→first computation device 12B→first communication device 13→Internet line NT→second communication device 22→second computation device 21B". The posture signal may be converted into an appropriate form on the path.

Accordingly, the second computation device 21B, as the synthesized remote image generation device, obtains the button operation signal and the stick operation signal output by the command reception device 11, the posture signal output by the head-mounted type image display device 10, the remote image signal output by the image capturing device 20, and the action state signal generated by the second computation device 21B itself.

The second computation device 21B, like the first computation device 12A, extracts a portion of the remote image based on the obtained posture signal (see FIG. 3).

The second computation device 21B, like the first computation device 12A, generates the command display image and the action display image based on the button operation signal, the stick operation signal, and the action state signal that are obtained.

The second computation device 21B, like the first computation device 12A, generates the synthesized remote image (see FIG. 4) by synthesizing the command display image and the action display image into the portion (the image A) of the remote image. Then, the second computation device 21B transmits the synthesized remote image signal relating to the synthesized remote image that is generated to the head-mounted type image display device 10 via a path as follows: "second computation device 21B→second communication device 22→Internet line NT→first communication device 13→first computation device 12B→head-mounted type image display device 10"

The head-mounted type image display device 10 displays the synthesized remote image before the eyes of the operator O based on the synthesized remote image signal that is transmitted.

In this way, in the remote operation system 1B according to the second embodiment as well, the command display image and the action display image are presented to the operator O performing the remote operation while viewing the remote image. Therefore, the operator O can confirm that the operation command is correctly received by using the command display image and grasp the state of the forklift that cannot be grasped from the remote image by using the action display image without interrupting the remote operation.

Third Embodiment

Figure 6:
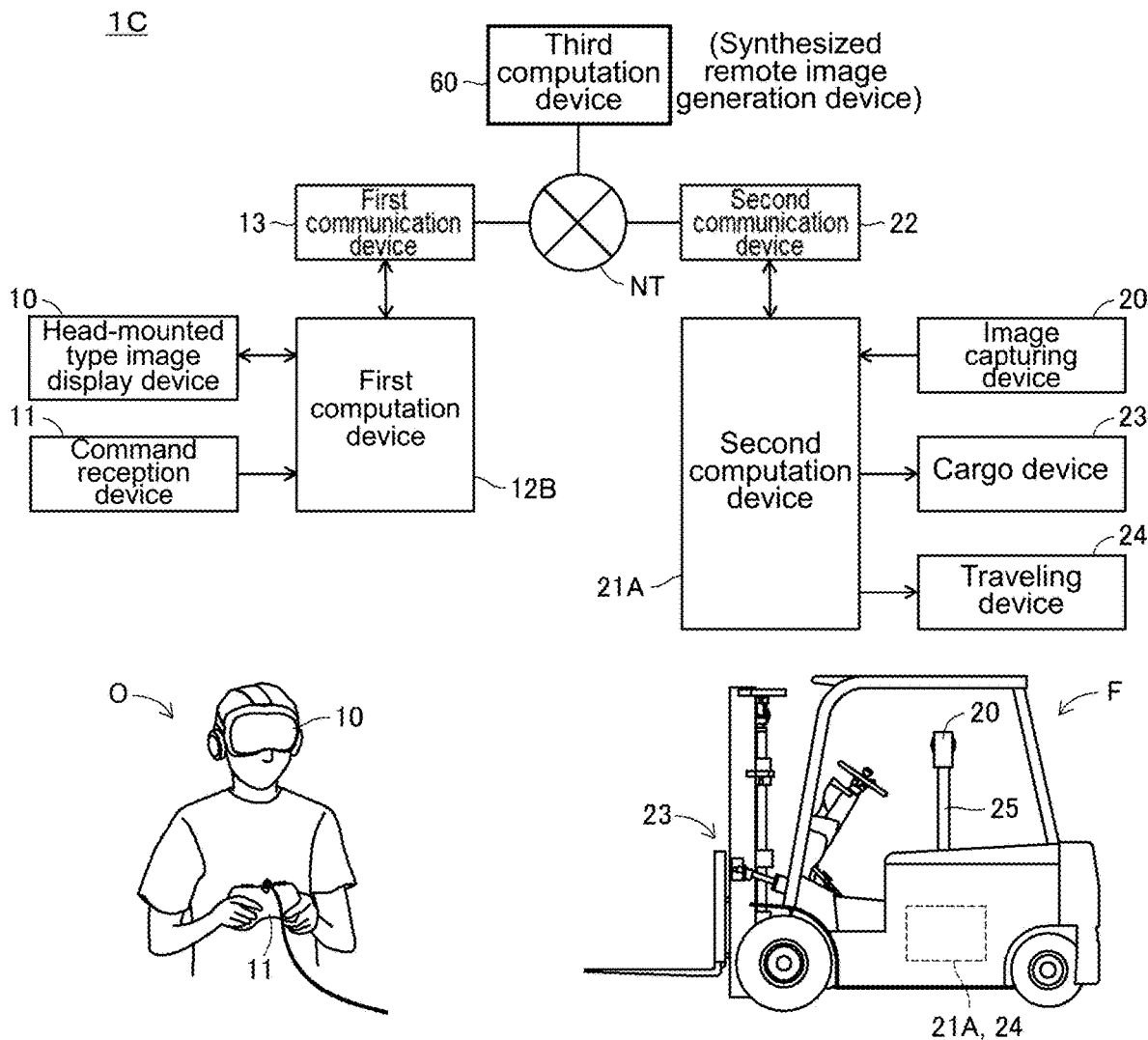
FIG. 6 is a view illustrating a configuration of a remote operation system according to a third embodiment of the invention.

FIG. 6 is a view illustrating a remote operation system 1C according to a third embodiment of the invention. The remote operation system 1C includes the head-mounted type image display device 10, the command reception device 11, the first computation device 12B, and the first communication device 13 on the side of the operator O, the image capturing device 20, the second computation device 21A and the second communication device 22 on the side of the forklift F, as well as a third computation device 60. The remote operation system 1C differs from the remote operation system 1A in the point that the remote operation system 1C includes the first computation device 12B instead of the first computation device 12A and further includes the third computation device 60, and the rest of the remote operation system 1C is common to the remote operation system 1A. The remote operation system 1C differs from the remote operation system 1B in the point that the remote operation system 1C includes the second computation device 21A instead of the second computation device 21B and further includes the third computation device 60, and the rest of the remote operation system 1C is common to the remote operation system 1B.

The third computation device 60 is a computer providing cloud service and set at a place separate from the operator O as well as the forklift F, and is connected to the Internet line NT. In the embodiment, the third computation device 60 is equivalent to a "synthesized remote image generation device".

When the operator O presses one of the buttons 30, 31, 32, and 33 of the command reception device 11, the button operation signal corresponding to the button (e.g., the first button 30) is transmitted to the second computation device 21A via a path as follows: "command reception device 11→first computation device 12B→first communication device 13→Internet line NT→second communication device 22→second computation device 21A", and is also transmitted to the third computation device 60 via a path as follows: "command reception device 11→first computation device 12B→first communication device 13→Internet line NT→third computation device 60". The button operation signal may be converted into an appropriate form on the path.

When the operator O tilts the analog stick 34 of the command reception device 11 to any direction, the stick operation signal corresponding to the tilting direction and the tilting amount of the analog stick 34 is transmitted to the second computation device 21A and the third computation device 60 via the same paths as the paths of the button operation signal. That is, the stick operation signal is transmitted to the second computation device 21A via a path as follows: "command reception device 11→first computation device 12B→first communication device 13→Internet line NT→second communication device 22→second computation device 21A", and is also transmitted to the third computation device 60 via a path as follows: "command reception device 11→first computation device 12B→first communication device 13→Internet line NT→third computation device 60". The stick operation signal may be converted into an appropriate form on the path.

The remote image signal relating to the 360° remote image output by the image capturing device 20 is transmitted to the third computation device 60 via a path as follows "image capturing device 20→second computation device 21A→second communication device 22→Internet line NT→third computation device 60". The remote image signal may be converted into an appropriate form on the path.

The action state signal relating to the state of each part of the forklift F that is grasped by the second computation device 21A and whether an abnormality occurs is transmitted to the third computation device 60 via a path as follows: "second computation device 21A→second communication device 22→Internet line NT→third computation device 60".

The posture signal output by the head-mounted type image display device 10 is transmitted to the third computation device 60 via a path as follows "head-mounted type image display device 10→first computation device 12B→first communication device 13→Internet line NT→third computation device 60". The posture signal may be converted into an appropriate form on the path.

Accordingly, the third computation device 60, as the synthesized remote image generation device, obtains the button operation signal and the stick operation signal output by the command reception device 11, the posture signal output by the head-mounted type image display device 10, the remote image signal output by the image capturing device 20, and the action state signal output by the second computation device 21A.

The third computation device 60, like the first computation device 12A and the second computation device 21B, extracts a portion of the remote image based on the obtained posture signal (see FIG. 3).

The third computation device 60, like the first computation device 12A and the second computation device 21B, generates the command display image and the action display image based on the button operation signal, the stick operation signal, and the action state signal that are obtained.

The third computation device 60, like the first computation device 12A and the second computation device 21B, generates the synthesized remote image (see FIG. 4) by synthesizing the command display image and the action display image into the portion (the image A) of the remote image. Then, the third computation device 60 transmits the synthesized remote image signal relating to the synthesized remote image that is generated to the head-mounted type image display device 10 via a path as follows: "third computation device 60→Internet line NT→first communication device 13→first computation device 12B→head-mounted type image display device 10".

The head-mounted type image display device 10 displays the synthesized remote image before the eyes of the operator O based on the synthesized remote image signal that is transmitted.

In this way, in the remote operation system 1C according to the third embodiment as well, the command display image and the action display image are presented to the operator O performing the remote operation while viewing the remote image. Therefore, the operator O can confirm that the operation command is correctly received by using the command display image and grasp the state of the forklift that cannot be grasped from the remote image by using the action display image without interrupting the remote operation.

MODIFIED EXAMPLES

Although the first embodiment, the second embodiment, and the third embodiment of the remote operation system according to the invention are described as the above, the configuration of the invention is not limited thereto.

For example, the head-mounted type image display device 10 may also be wirelessly connected to the first computation device 12A, 12B or the first communication device 13. In the case where the head-mounted type image display device 10 is wirelessly connected to the first communication device 13, the posture signal is transmitted to the first computation device 12A via a path as follows "head-mounted type image display device 10→first communication device 13→first computation device 12A", transmitted to the second computation device 21B via a path as follows "head-mounted type image display device 10→first communication device 13→Internet line NT→second communication device 22→second computation device 21B", or transmitted to the third computation device 60 via a path as follows "head-mounted type image display device 10→first communication device 13→Internet line NT→third computation device 60". In addition, in such case, the synthesized remote image signal is transmitted to the head-mounted type image display device 10 via a path as follows: "first computation device 12A→first communication device 13→head-mounted type image display device 10", via a path as follows "second computation device 21B→second communication device 22→Internet line NT→first communication device 13→head-mounted type image display device 10", or a path as follows "third computation device 60→Internet line NT→first communication device 13→head-mounted type image display device 10".

In addition, the command reception device 11 may also be wirelessly connected to the first computation device 12A, 12B, or the first communication device 13. In the case where the command reception device 11 is wirelessly connected to the first communication device 13, the button operation signal and the stick operation signal are transmitted to the first computation device 12A via a path as follows "command reception device 11→first communication device 13→first computation device 12A", transmitted to the second computation device 21B via a path as follows "command reception device 11→first communication device 13→Internet line NT→second communication device 22→second computation device 21B", or transmitted to the third computation device 60 via a path as follows "command reception device 11→first communication device 13→Internet line NT→third communication device 60".

In addition, the first computation device 12A, 12B may also be wirelessly connected to the first communication device 13.

In addition, the command reception device 11 is not limited to a device similar to a controller of a game console held by both hands. In the invention, any device that is within reach of a hand the operator O and capable of receiving the remote operation command from the operator O can be used as the command reception device 11.

In addition, the image capturing device 20 is not limited to a 360° camera. In place of a 360° camera, a combination of multiple cameras facing different directions may be used, for example. In such case, it suffices as long as the synthesized remote image generation device 12A, 21B, 60 selects the remote image captured by one or more of the cameras to be used in accordance with the posture signal, and synthesizes the command display image and the action display image into the selected remote image.

In addition, the image capturing device 20 may also be installed to the forklift F by a means other than the pole 25. For example, the image capturing device 20 may also be suspended from a head guard.

In addition, the second computation device 21A, 21B may also be a unit separate from the vehicle control unit ECU handling the control of the cargo device 23 and the traveling device 24. However, in such case, the two units need to be able to exchange signals with each other.

In addition, the command display image and the action display image shown in FIG. 4 merely serve as an example. The layouts of the images and the information included in the images may also be modified as appropriate. The layouts of the images and the information included in the images may also be customizable by the operator O.

In addition, the remote operation system according to the invention may also be used to remotely operate an engine-type forklift.

What is claimed is:

1. A remote operation system, comprising:
   an image capturing device, provided at a forklift at a place separate from an operator;
   a head-mounted image display device, mounted to a head of the operator;
   a controller comprising at least one button, within reach of a hand of the operator and receiving a remote operation command by the operator; and
   a processor, configured to:
   generate a command display image indicating a content of the remote operation command received by the controller,
   generate an action display image indicating an action state of the forklift acting in accordance with the remote operation command, obtain a remote image captured by the image capturing device, and
   generate a synthesized remote image by synthesizing the command display image and the action display image into the remote image,
   wherein the head-mounted image display device displays the synthesized remote image that is generated by the processor before eyes of the operator,
   wherein the processor is further configured to detect a posture of the head of the operator, the processor obtains the posture, extracts a portion of the remote image in accordance with the posture, and generates the synthesized remote image by synthesizing the command display image and the action display image into the portion of the remote image that is extracted from the remote image in accordance with the posture, wherein a size of the portion of the remote image is unchanged in response to change of the posture,
   wherein the synthesized remote image comprises the content of the remote operation command, the action state of the forklift and the remote image.

2. The remote operation system as claimed in claim 1, wherein the processor is disposed on a side of the operator, and obtains the action state of the forklift and the remote image from the forklift via an Internet line.

3. The remote operation system as claimed in claim 1, wherein the processor is disposed at the forklift, and obtains the content of the remote operation command from the controller via an Internet line.

4. The remote operation system as claimed in claim 1, wherein the processor is disposed at a place separate from the operator and the forklift, obtains the action state of the forklift and the remote image from the forklift via an Internet line, and obtains the content of the remote operation command from the controller via the Internet line.

5. The remote operation system as claimed in claim 1, wherein the controller comprises four buttons arranged in a cross shape and corresponding to lifting and lowering of a fork provided at the forklift and forward and backward leaning of a mast provided at the forklift,
   wherein the command display image comprises four cargo symbols arranged in a cross shape and corresponding to the four buttons, and
   when any one of the four buttons is operated, an appearance of the cargo symbol corresponding to the button changes.

6. The remote operation system as claimed in claim 1, wherein the controller comprises an analog stick for providing a command on a traveling direction and a traveling speed of the forklift, and
   the command display image comprises a vehicle symbol with the forklift set as a motif and a traveling symbol whose relative position from the vehicle symbol changes in response to a tilting direction and a tilting amount of the analog stick.

* * * * *